United States Patent
MacKinnon et al.

(10) Patent No.: US 11,185,830 B2
(45) Date of Patent: Nov. 30, 2021

(54) FLUID MIXER

(71) Applicant: Waters Technologies Corporation, Milford, MA (US)

(72) Inventors: Peter MacKinnon, Providence, RI (US); Michael R. Jackson, Woonsocket, RI (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 295 days.

(21) Appl. No.: 16/111,733

(22) Filed: Aug. 24, 2018

(65) Prior Publication Data

US 2019/0070572 A1    Mar. 7, 2019

Related U.S. Application Data

(60) Provisional application No. 62/554,835, filed on Sep. 6, 2017.

(51) Int. Cl.
*B01F 5/06*       (2006.01)
*B01F 13/00*      (2006.01)
*B01D 15/16*      (2006.01)

(52) U.S. Cl.
CPC .......... *B01F 5/0645* (2013.01); *B01D 15/166* (2013.01); *B01F 5/0641* (2013.01); *B01F 5/0644* (2013.01); *B01F 13/0061* (2013.01); *B01F 2215/0037* (2013.01)

(58) Field of Classification Search
CPC .......... B01F 5/0644; B01F 5/06; B01F 5/064; B01F 5/0645; B01F 5/0646; B01F 15/0264; B01F 13/0059; B01F 3/10; B01F 13/0061
See application file for complete search history.

(56) References Cited

U.S. PATENT DOCUMENTS

| | | |
|---|---|---|
| 3,404,869 A | 10/1968 | Harder |
| 3,583,678 A | 6/1971 | Harder |
| 3,595,531 A | 7/1971 | Williams et al. |
| (Continued) | | |

FOREIGN PATENT DOCUMENTS

| | | |
|---|---|---|
| CN | 1964777 A | 5/2007 |
| CN | 102686321 A | 9/2012 |
| (Continued) | | |

OTHER PUBLICATIONS

Invitation to Pay Additional Fees and Partial International Search in PCT/US2018/047899 dated Nov. 13, 2018; 16 pages.
(Continued)

*Primary Examiner* — Elizabeth Insler
(74) *Attorney, Agent, or Firm* — Schmeiser, Olsen & Watts LLP

(57) ABSTRACT

A fluid mixer includes a flow splitter and a mixing chamber. The flow splitter includes an inlet for receiving a flow of fluid and is configured to split the flow of fluid into first and second fluid streams. The second fluid stream has a higher density than the first fluid stream. The mixing chamber includes a first inlet, a second inlet and a mixing well. The second inlet is positioned below the first inlet. The second inlet of the mixing chamber is configured to receive the first fluid stream and the first inlet of the mixing chamber is configured to receive the second fluid stream to promote mixing of the first and second streams in the mixing well.

10 Claims, 11 Drawing Sheets

(56) References Cited

U.S. PATENT DOCUMENTS

| | | | |
|---|---|---|---|
| 3,830,369 A | 8/1974 | Pfadenhauer | |
| 3,857,551 A | 12/1974 | Troy | |
| 3,860,217 A | 1/1975 | Grout | |
| 3,985,019 A | 10/1976 | Boehme et al. | |
| 4,198,168 A | 4/1980 | Penn | |
| 4,311,586 A | 1/1982 | Baldwin et al. | |
| 4,437,812 A | 3/1984 | Abu-Shumays et al. | |
| 4,496,245 A | 1/1985 | Conrad et al. | |
| 4,506,987 A | 3/1985 | Daughton et al. | |
| 4,534,659 A | 8/1985 | Dourdeville et al. | |
| 4,767,279 A | 8/1988 | Dourdeville et al. | |
| 4,842,730 A | 6/1989 | James et al. | |
| 4,882,062 A | 11/1989 | Moeller et al. | |
| 4,882,063 A | 11/1989 | Allington et al. | |
| 4,954,253 A | 9/1990 | Alexandrov et al. | |
| 4,971,450 A * | 11/1990 | Gerich | B01F 5/064 366/340 |
| 5,275,723 A | 1/1994 | Greenley et al. | |
| 5,304,487 A | 4/1994 | Wilding et al. | |
| 5,423,661 A | 6/1995 | Gabeler et al. | |
| 5,486,335 A | 1/1996 | Wilding et al. | |
| 5,637,469 A | 6/1997 | Wilding et al. | |
| 5,656,034 A | 8/1997 | Kochersperger et al. | |
| 5,664,938 A | 9/1997 | Tang | |
| 5,738,783 A | 4/1998 | Shirota et al. | |
| 5,846,411 A | 12/1998 | Harter et al. | |
| 5,887,977 A | 3/1999 | Morikawa | |
| 5,904,424 A * | 5/1999 | Schwesinger | B01F 5/0604 366/336 |
| 5,918,976 A | 7/1999 | Hashimoto et al. | |
| 6,048,496 A | 4/2000 | Zhou et al. | |
| 6,170,981 B1 | 1/2001 | Regnier et al. | |
| 6,190,034 B1 | 2/2001 | Nielsen et al. | |
| 6,319,469 B1 | 11/2001 | Mian et al. | |
| 6,629,775 B2 | 10/2003 | Choikhet et al. | |
| 6,637,463 B1 | 10/2003 | Lei et al. | |
| 6,705,357 B2 | 3/2004 | Jeon et al. | |
| 6,843,262 B2 | 1/2005 | Ismagilov et al. | |
| 6,845,787 B2 | 1/2005 | Karp et al. | |
| 6,851,846 B2 | 2/2005 | Fujii et al. | |
| 6,883,559 B2 | 4/2005 | Jeon et al. | |
| 6,887,384 B1 | 5/2005 | Frechet et al. | |
| 6,890,093 B2 | 5/2005 | Karp et al. | |
| 6,893,547 B2 | 5/2005 | Gascoyne et al. | |
| 6,916,113 B2 | 7/2005 | Van de Goor et al. | |
| 6,919,046 B2 | 7/2005 | O'Connor et al. | |
| 6,942,792 B2 | 9/2005 | Aso | |
| 6,958,119 B2 | 10/2005 | Vin et al. | |
| 6,981,522 B2 | 1/2006 | O'Connor et al. | |
| 6,987,263 B2 | 1/2006 | Hobbs et al. | |
| 6,991,729 B2 | 1/2006 | Ikeda et al. | |
| 7,105,304 B1 | 9/2006 | Nikiforov et al. | |
| 7,111,501 B2 | 9/2006 | Rocklin et al. | |
| 7,112,277 B2 | 9/2006 | Bidlingmeyer et al. | |
| 7,134,453 B2 | 11/2006 | Peters et al. | |
| 7,143,785 B2 | 12/2006 | Maerkl et al. | |
| 7,147,364 B2 | 12/2006 | Oohashi et al. | |
| 7,178,386 B1 | 2/2007 | Gamble et al. | |
| 7,204,139 B2 | 4/2007 | Takayama | |
| 7,207,345 B2 | 4/2007 | Somerville | |
| 7,241,423 B2 | 7/2007 | Golbig et al. | |
| 7,261,812 B1 | 8/2007 | Karp et al. | |
| 7,278,329 B2 | 10/2007 | Weissgerber et al. | |
| 7,314,070 B2 | 1/2008 | Jeon et al. | |
| 7,390,121 B2 | 6/2008 | Jahn et al. | |
| 7,744,762 B2 | 6/2010 | Lazar | |
| 7,887,753 B2 | 2/2011 | Quake et al. | |
| 7,976,779 B2 | 7/2011 | Tai et al. | |
| 8,329,407 B2 | 12/2012 | Ismagilov et al. | |
| 8,511,889 B2 * | 8/2013 | Choikhet | B01F 5/0646 366/336 |
| 8,696,193 B2 | 4/2014 | Herbstritt | |
| 8,764,279 B2 | 7/2014 | Caslo et al. | |
| 8,979,358 B2 | 3/2015 | Wiechers | |
| 9,128,071 B2 | 9/2015 | Tsukada et al. | |
| 9,527,010 B2 | 12/2016 | Williams et al. | |
| 9,528,968 B2 | 12/2016 | Murphy et al. | |
| 9,557,317 B2 | 1/2017 | Ozbal | |
| 9,566,537 B2 | 2/2017 | Geng | |
| 9,636,646 B2 | 5/2017 | Neerincx et al. | |
| 9,679,757 B2 | 6/2017 | Netto et al. | |
| 9,766,217 B2 | 9/2017 | Kidal et al. | |
| 9,791,107 B2 | 10/2017 | Witt et al. | |
| 9,884,266 B2 | 2/2018 | Dauphas et al. | |
| 9,945,820 B2 | 4/2018 | Albrecht, Jr. | |
| 9,968,894 B2 | 5/2018 | Shreve | |
| 9,970,908 B2 | 5/2018 | Yotani et al. | |
| 9,987,604 B2 | 6/2018 | Baaske et al. | |
| 10,052,628 B2 | 8/2018 | Glazier et al. | |
| 10,088,459 B2 | 10/2018 | Onoda et al. | |
| 10,238,989 B2 | 3/2019 | Luongo et al. | |
| 10,247,673 B2 | 4/2019 | Peterman et al. | |
| 10,295,512 B2 | 5/2019 | Pohl et al. | |
| 10,335,753 B2 | 7/2019 | De Corral et al. | |
| 2002/0113095 A1 | 8/2002 | Jeon et al. | |
| 2002/0134143 A1 | 9/2002 | Allington et al. | |
| 2003/0077204 A1 | 4/2003 | Seki et al. | |
| 2003/0123322 A1 | 7/2003 | Chung et al. | |
| 2004/0011413 A1 | 1/2004 | Fujii et al. | |
| 2004/0092033 A1 | 5/2004 | Gustafson et al. | |
| 2004/0096867 A1 | 5/2004 | Andersson et al. | |
| 2004/0109793 A1 | 6/2004 | McNeely et al. | |
| 2005/0118070 A1 | 6/2005 | Griss et al. | |
| 2005/0252840 A1 | 11/2005 | Arnold et al. | |
| 2006/0039829 A1 | 2/2006 | Suk et al. | |
| 2006/0171864 A1 | 8/2006 | Caze et al. | |
| 2006/0273012 A1 | 12/2006 | Dehmer | |
| 2006/0280029 A1 | 12/2006 | Garstecki et al. | |
| 2006/0285433 A1 | 12/2006 | Yang et al. | |
| 2007/0113907 A1 | 5/2007 | Brennen et al. | |
| 2007/0148048 A1 | 6/2007 | Jousse | |
| 2007/0177458 A1 | 8/2007 | Meiners et al. | |
| 2007/0240989 A1 | 10/2007 | Levitan et al. | |
| 2007/0263477 A1 | 11/2007 | Sudarsan et al. | |
| 2007/0269894 A1 | 11/2007 | Howland et al. | |
| 2007/0297285 A1 | 12/2007 | Cross et al. | |
| 2008/0043570 A1 | 2/2008 | Arnold et al. | |
| 2009/0044619 A1 | 2/2009 | Fiering et al. | |
| 2009/0142846 A1 | 6/2009 | Crenshaw et al. | |
| 2009/0148858 A1 | 6/2009 | Patel et al. | |
| 2009/0207687 A1 | 8/2009 | Kemperman et al. | |
| 2009/0255601 A1 | 10/2009 | Baeuerle et al. | |
| 2009/0268548 A1 | 10/2009 | Hartmann et al. | |
| 2010/0040483 A1 | 2/2010 | Berger et al. | |
| 2010/0078086 A1 | 4/2010 | Guidat et al. | |
| 2010/0159573 A1 | 6/2010 | Chung et al. | |
| 2010/0189602 A1 | 7/2010 | Baeuerle et al. | |
| 2011/0113866 A1 | 5/2011 | Finlay | |
| 2011/0192217 A1 | 8/2011 | Choikhet et al. | |
| 2012/0269027 A1 | 10/2012 | Xia et al. | |
| 2012/0309648 A1 | 12/2012 | Tseng et al. | |
| 2014/0061133 A1 | 3/2014 | Herman | |
| 2014/0230528 A1 | 8/2014 | Wang et al. | |
| 2014/0241110 A1 | 8/2014 | Igata | |
| 2014/0345372 A1 | 11/2014 | Gerhardt et al. | |
| 2015/0265978 A1 | 9/2015 | Barciela et al. | |
| 2016/0161454 A1 | 6/2016 | Jones et al. | |
| 2016/0250606 A1 | 9/2016 | Nasman | |
| 2016/0266078 A1 | 9/2016 | Onoda et al. | |
| 2017/0173496 A1 | 6/2017 | Stone | |
| 2017/0333898 A1 | 11/2017 | Saleh et al. | |
| 2018/0056252 A1 | 3/2018 | Steele et al. | |
| 2018/0088091 A1 | 3/2018 | Cormier et al. | |
| 2019/0070571 A1 | 3/2019 | Jackson et al. | |
| 2019/0170706 A1 | 6/2019 | Gilar et al. | |
| 2019/0265206 A1 | 8/2019 | Tarafder | |
| 2019/0383777 A1 | 12/2019 | Inoue | |
| 2020/0023295 A1 | 1/2020 | Moeller et al. | |
| 2020/0025723 A1 | 1/2020 | Gilar et al. | |
| 2020/0276728 A1 | 9/2020 | Zeko et al. | |

(56) References Cited

U.S. PATENT DOCUMENTS

FOREIGN PATENT DOCUMENTS

| | | |
|---|---|---|
| CN | 203061073 U | 7/2013 |
| CN | 203385703 U | 1/2014 |
| CN | 204116295 U | 1/2015 |
| CN | 104948351 A | 9/2015 |
| CN | 106166453 A | 11/2016 |
| CN | 106422832 A | 6/2017 |
| CN | 106902662 A | 6/2017 |
| CN | 104076112 B | 9/2018 |
| CN | 109173766 A | 1/2019 |
| CN | 209333548 U | 9/2019 |
| CN | 110394105 A | 11/2019 |
| DE | 19511603 A1 | 10/1996 |
| DE | 19902697 A1 | 7/2000 |
| DE | 102015100693 A1 | 7/2016 |
| DE | 102018104840 A1 | 4/2018 |
| EP | 1174179 A1 | 1/2002 |
| EP | 1193496 A1 | 4/2002 |
| EP | 1243314 A2 | 9/2002 |
| EP | 1566215 A2 | 8/2005 |
| EP | 1788388 A1 | 5/2007 |
| EP | 2106846 A1 | 10/2009 |
| FR | 3075068 A1 | 6/2019 |
| JP | 5191175 A | 8/1976 |
| JP | S51102252 A | 9/1976 |
| JP | S5592130 A | 7/1980 |
| JP | 55159831 A * | 12/1980 ............ B01F 5/0644 |
| JP | S55159831 A | 12/1980 |
| JP | 6248428 U | 3/1987 |
| JP | 6295727 U | 6/1987 |
| JP | S6295727 U | 6/1987 |
| JP | S62210042 A | 9/1987 |
| JP | H02167469 A | 6/1990 |
| JP | H06324026 A | 11/1994 |
| JP | H07159388 A | 6/1995 |
| JP | 2587162 Y2 | 12/1998 |
| JP | H02170047 A | 6/1999 |
| JP | 2603770 Y2 | 3/2000 |
| JP | 3665680 B2 | 6/2005 |
| JP | 2005211857 A | 8/2005 |
| JP | 2006003203 A | 1/2006 |
| JP | 3780917 B2 | 5/2006 |
| JP | 2006122735 A | 5/2006 |
| JP | 2006281008 A | 10/2006 |
| JP | 3865119 B2 | 1/2007 |
| JP | 2007090262 A | 4/2007 |
| JP | 3959436 B2 | 8/2007 |
| JP | 4043718 B2 | 2/2008 |
| JP | 4082309 B2 | 4/2008 |
| JP | 2009018311 A | 1/2009 |
| JP | 2009208052 A | 9/2009 |
| JP | 4348820 B2 | 10/2009 |
| JP | 4360206 B2 | 11/2009 |
| JP | 2010082533 A | 4/2010 |
| JP | 4683066 B2 | 5/2011 |
| JP | 5427603 B2 | 2/2014 |
| KR | 20020085903 A | 11/2002 |
| KR | 20040069496 A | 8/2004 |
| KR | 100666500 B1 | 1/2007 |
| KR | 101736797 B1 | 5/2017 |
| KR | 102014601 B1 | 8/2019 |
| NL | 2006787 C | 11/2012 |
| WO | 1997000125 A1 | 1/1997 |
| WO | 0022436 A1 | 4/2000 |
| WO | 2003015890 A1 | 2/2003 |
| WO | 2003024598 A1 | 3/2003 |
| WO | 2003047736 A1 | 6/2003 |
| WO | 2003098218 A1 | 11/2003 |
| WO | 2005063368 A3 | 7/2005 |
| WO | 2006017039 A1 | 2/2006 |
| WO | 2007021755 A2 | 2/2007 |
| WO | 2010015238 A1 | 2/2010 |
| WO | 2010022428 A1 | 3/2010 |
| WO | 2010030720 A1 | 3/2010 |
| WO | 2010107677 A1 | 3/2010 |
| WO | 2010083884 A1 | 7/2010 |
| WO | 2011003412 A2 | 1/2011 |
| WO | 2011158430 A1 | 12/2011 |
| WO | 2012166756 A1 | 12/2012 |
| WO | 2013090141 A1 | 6/2013 |
| WO | 2013187916 A1 | 12/2013 |
| WO | 2014034259 A1 | 3/2014 |
| WO | 2016082520 A1 | 6/2016 |
| WO | 2018226907 A2 | 12/2018 |
| WO | 2019086671 A1 | 5/2019 |
| WO | 2019097490 A1 | 5/2019 |
| WO | 2019167011 A1 | 9/2019 |
| WO | 2019168970 A1 | 9/2019 |
| WO | 2019186223 A1 | 10/2019 |
| WO | 2019204508 A1 | 10/2019 |
| WO | 2019229819 A1 | 12/2019 |
| WO | 2019240653 A1 | 12/2019 |
| WO | 2020099865 A1 | 5/2020 |

OTHER PUBLICATIONS

International Preliminary Report on Patentability in PCT/US2018/047899 dated Mar. 19, 2020.
International Preliminary Report on Patentability in PCT/US2018/047904 dated Mar. 19, 2020.
International Search Report and Written Opinion in PCT/US2018/047904 dated Apr. 5, 2019; 21 pages.
International Search Report & Written Opinion in PCT/US2018/047899 dated Jan. 10, 2019; 22 pages.
Invitation to Pay Additional Fees and Partial Search Report in PCT/US2018/047904 dated Feb. 15, 2019; 15 pages.
"Appropriate Mixer Volume for HPLC and UHPLC Applications," Oct. 11, 2014. https://hplctips.blogspot.com/2014/10/appropriate-mixer-volume-for-hplc-and.html.
"Dynamic Mixing Chamber Manual V.7119-1," Knauer, Berlin, Germany, Aug. 2016.
"HPLC Gradient Mixers," Mott, 2020. https://mottcorp.com/product/mixers/hplc-gradient-static-mixers/.
"HyperShear(TM) HPLC and UHPLC Mixers" 2014, Analytical Scientific Instruments US, Inc.
"Reliable Solvent Mixing in UHPLC," Thermo Fisher Scientific, Inc., 2016.
"Varian Dual Chamber Dynamic Mixer Instruction Manual," Varian, Publication No. 0391467400, Issue 5, Feb. 2009.
Chen, et al. "Combining selection valve and mixing chamber for nanoflow gradient generation: Toward developing a iquid chromatography cartridge coupled with mass spectrometer for protein and peptide analysis." Analytica Chimica Acta 887 (2015) pp. 230-236.
Chisolm, et al. "Development and characterization of 'push-pull' sampling device with fast reaction quenching coupled to high-performance liquid chromatography for pharmaceutical process analytical technologies," Journal of Chromatography A 1217 (2010) 7471-7477.
Davis, et al. "A Sample, Reliable Rapid-Mixing Apparatus for Continuous-Flow Studies," Analytical Biochemistry 97 (1979) pp. 428-437.
Engelhardt, Heinz and Helmut Elgass, "Problems in the application of gradient elution to high-pressure iquid chromatography," Journal of Chromatography 112 (1975) pp. 415-423.
Gilbert, Scott "Lab-on-a-chip miniaturized on-line liquid chromatography," Crystal Vision Microsystems, CPAC Satellite Workshop, Rome, Italy, Mar. 20-22, 2006.
Huft, et al. "Microfluidic Integration of Paralell Solid-Phase Liquid Chromatography," Analytical Chemistry 85 (2013) 2999-3005.
Anovska, et al. "Development of small-volume, microfluidic chaotic mixers for future application in two-dimensional liquid chromatography," RSC Adv., 2017, 7, pp. 9090-9099.
Kaminski, et al. "Programming the Elution Gradient in High-Performance Chromatography by Varying the Volume of the Mixing Chambers," Journal of Chromatography 176 (1979) pp. 171-180.
Kostanyan, Artak E. and Andrei A. Voshkin, "Support-free pulsedliquid-liquid chromatogrpahy," Journal of Chromatography A 1216 (2009) p. 7761-7766.

(56) References Cited

OTHER PUBLICATIONS

Lawati, et al. "Combination of capillary micellar liquid chromatography with on-chip microfluidic chemiluminescence detection for direct analysis of buspirone in human plasma," Taianta 127 (2014) pp. 230-238.

Qian, Shizhi and Haim H. Bau, "Magneto-hydrodynamics based microfluidics," Mechanics Research Communications 36 (2009) 10-21.

Shi, et al., "Mixing enhancement via a serpentine micromixer for real-time activation of carboxyl," Chemical Engineering Journal, 2019. https://doi.org/10.1016/j.cej.2019.123642.

Steele, et al. "Reducing HPLC/UHPLC System Noise and Volume with High Performance Static Mixers," Feb. 26, 2017, Mott Corporation.

Takeuchi, Toyohide and Daido Ishii, "Continuous Gradient Elution in Micro High-Performance Liquid Chromatography," Journal of Chromatography 253 (1982) pp. 41-47.

Wang, et al. "On-line two-dimensional countercurrent chromatography × high performance liquid chromatography system with a novel fragmentarydilution and turbulent mixing interface for preparation of coumarinsfrom Cnidium monnieri" Journal of Chromatography A, 1406 (2015) pp. 215-223.

Nguyen, Nam-Trung and Steven T. Wereley, "Fundamentals and Applications of Microfluidics, Second Edition," 2006, Artech House, Inc., p. 380.

International Search Report and Written Opinion in PCT/US2020/045581 dated Nov. 11, 2020.

Jeon, et al., "Generation of Solution and Surface Gradients Using Microfluidic Systems," Langmuir 2000,vol. 16, No. 22, pp. 8311-8316.

Restriction/Election Requirement in U.S. Appl. No. 16/111,699, dated Jan. 21, 2021; 8 pages.

Examination Report in European Patent Application No. 18811085.2 dated May 11, 2021.

Examination Report in European Patent Application No. 18765324.1 dated May 11, 2021.

Non-Final Office Action in U.S. Appl. No. 16/111,699 dated Jun. 1, 2021.

\* cited by examiner

FLUID MIXER

RELATED APPLICATIONS

This application claims the benefit of and priority to U.S. provisional application No. 62/554,835, filed Sep. 6, 2017, titled "FLUID MIXER" the entirety of which is incorporated by reference herein.

FIELD OF THE INVENTION

The invention relates generally to fluid mixers. More specifically, the invention relates to multi-path fluid mixers for use in microfluidic separation systems to mix solvent compositions.

BACKGROUND

Chromatography is a set of techniques for separating a mixture into its constituents. Generally, in a liquid chromatography analysis, a pump takes in and delivers a composition of liquid solvents at high pressure to a sample manager, where a sample (i.e., material under analysis) awaits injection into the mixture. Disposed between the pump and sample manager, a mixer blends the liquid solvents into a substantially homogenous composition. From the sample manager, the resulting composition comprised of the mixture of liquid solvents and injected sample moves to a point of use, such as a column of particulate matter. By passing the composition through the column, the various components in the sample separate from each other at different rates and thus elute from the column at different times. A detector receives the elution from the column and produces an output from which the identity and quantity of the analytes may be determined.

High-performance liquid chromatography (HPLC) uses two basic elution modes: isocratic elution and gradient elution. In the isocratic elution mode, the mobile phase, comprised of either a pure solvent or a mixture of solvents, remains the same throughout the chromatography run. In the gradient elution mode, the composition of the mobile phase changes during the separation. Creation of the gradient involves the mixing of multiple solvents, the proportions of which change over time in accordance with a predetermined timetable. Some HPLC systems create the gradient under high pressure, by mixing the solvents downstream, on the outlet side of the pumps. Such HPLC systems are referred to herein as high-pressure gradient systems. Other HPLC systems create the gradient under low pressure, using a gradient proportioning valve to select from up to four solvents, combining the multiple solvents on the intake side of a single aspirating pump, and changing the proportions of the solvents over time. Such HPLC systems are referred to herein as low-pressure gradient systems.

The choice between a high-pressure and a low-pressure gradient system involves a variety of tradeoffs. For one, high-pressure gradient systems have lesser dwell volumes than low-pressure gradient systems because the solvent mixing occurs after the pumps instead of before the intake side of the pump. On the other hand, low-pressure gradient systems can produce a gradient with just one pump, whereas high-pressure gradient systems generally require one pump for each solvent. Hence, low-pressure-gradient systems are more amenable than high-pressure gradient systems to tertiary and quaternary gradients, and, thus, find use predominantly in such chromatography applications, whereas high-pressure gradient systems generally involve binary gradients.

The output stream of solvent composition produced by low-pressure and high-pressure gradient systems typically has detectable perturbations in a chromatographic baseline, referred to as compositional noise. When a gradient pump outputs a mixture of two fluids—either isocratic or gradient elution—frequencies of operation manifest as oscillations in the compositional output.

A conventional approach for reducing compositional noise is to couple a large-volume mixer to the output of the pump system. This mixer, however, may add an undesirable amount of delay volume to the chromatography system, which can affect the delivery of accurate and reproducible gradients and negatively affect cycle time for a liquid chromatography system. Furthermore, the mixer may actually be ineffective in adequately reducing the compositional noise.

The applicant previously proposed in WO2013/090141, the content of which is herein incorporated in its entirety, a fluid mixer comprising a mixing well, a distribution well, and a plurality of fluidic paths extending from the distribution well to the mixing well. The flow of solvent composition splits at the distribution well into as many streams as fluidic paths. The fluidic paths have different dwell volumes that determine a percentage of the flow of solvent composition carried by each of the fluidic paths. The dwell volumes of the fluidic paths are specifically configured to target the known noise characteristic in the flow of solvent composition. The streams recombine at the mixing well in accordance with the percentages determined by the dwell volumes of the fluidic paths to produce an output compositional stream having the noise characteristic attenuated.

Such known fluid mixers, wherein each path has a different dwell volume, may serve to reduce or substantially eliminate compositional noise. However, the different dwell volumes cause differing volumetric flow rates in each fluidic path. Accordingly, the time taken for a fluid to pass through a fluidic path will be different for each fluidic path. This leads to inconsistent channel clearance, which can require additional down time when the solvents are changed.

When 2 or more fluids (e.g. solvents) are mixed, it is generally desirous to achieve a substantially homogenous resulting fluid. However, the density of at least some of the constituent fluids (e.g. solvents) may differ. The fluids may be substantially immiscible.

SUMMARY

In one aspect, the present invention provides a fluid mixer comprising:
a flow splitter comprising an inlet for receiving a flow of fluid, the flow splitter configured to split the flow of fluid into first and second fluid streams, the second fluid stream having a higher density than the first fluid stream; and
a mixing chamber comprising a first inlet and a second inlet, the second inlet positioned below the first inlet; and a mixing well, wherein the second inlet of the mixing chamber is configured to receive the first fluid stream and the first inlet of the mixing chamber is configured to receive the second fluid stream, to promote mixing of the first and second streams in the mixing well.

In some embodiments, the flow splitter comprises:
a splitter well in fluid communication with the inlet;
a first outlet in fluid communication with the splitter well, for conveying the first stream; and a second outlet in fluid communication with the splitter well, for conveying the second stream.

In some embodiments, the second outlet is positioned below the first outlet.

In some embodiments, the first outlet and the second outlet are on opposing sides of the splitter well.

In some embodiments, the flow splitter comprises a splitter plate which presents a leading edge to the flow of fluid in use, to create said first stream above the splitter plate and said second stream below the splitter plate.

In some embodiments, the vertical position of the splitter plate is adjustable.

In some embodiments, at least a part of the splitter plate is generally co-planar with the direction of the flow of fluid in use.

In some embodiments, the fluid mixer further comprises:

a first channel having an inlet to receive and convey the first fluid stream towards an outlet of the first channel, the outlet of the first channel in fluid communication with the second inlet of the mixing chamber; and a second channel having an inlet to receive and convey the second fluid stream towards an outlet of the second channel, the outlet of the second channel in fluid communication with the first inlet of the mixing chamber.

In some embodiments, the length of the first channel is substantially the same as the length of the second channel.

In some embodiments, the volume of the first channel is substantially the same as the volume of the second channel.

In some embodiments, the cross-sectional area of the first channel is substantially the same as the cross-sectional area of the second channel.

In some embodiments, the first and second inlets of the mixing chamber are on opposing sides of the mixing well.

In some embodiments, the axis of the first inlet of the mixing chamber is substantially co-axial with the axis of the second inlet of the mixing chamber, such that the first and second fluid streams are directed substantially towards one another in the mixing well.

In some embodiments, the volume of the first channel is dissimilar to the volume of the second channel.

In some embodiments, each channel comprises a flow restrictor fluidly connected to a conduit, the conduit being downstream of the flow restrictor.

In some embodiments, the length of the conduit of the first channel is substantially equal to the length of the conduit of the second channel.

In some embodiments, the length of the conduit of the first channel is different to the length of the conduit of the second channel.

In some embodiments, the cross-section area of the conduit of the first channel is different to the cross-section area of the conduit of the second channel.

In some embodiments, the flow restrictors are substantially identical.

In some embodiments, the pressure drop across each of the flow restrictors is substantially identical.

In some embodiments, the pressure drop across the flow restrictor of at least one channel is greater than the pressure drop across the conduit of the channel.

In some embodiments, the pressure drop across the flow restrictor of a channel is at least 10 times greater than the pressure drop across the conduit of that channel.

In some embodiments, the channels are configured to have substantially identical volumetric flow rates.

In some embodiments, there is provided a fluid mixer arrangement, comprising a plurality of fluid mixers according to the claims.

In some embodiments, the mixing chamber of each fluid mixer comprises an outlet and the plurality of fluid mixers are arranged in series, such that the outlet of the mixing chamber of a first mixer is fluidly connected to the inlet of the flow splitter of a subsequent fluid mixer.

In some embodiments, at least a second fluid mixer is provided in at least one of the fluid streams of a first fluid mixer.

In one aspect, the present invention provides a fluid mixer comprising:

a flow splitter comprising an inlet for receiving a flow of fluid, the flow splitter configured to split the flow of fluid into a plurality of fluid streams;

a plurality of channels, each for conveying a corresponding one of the plurality of streams;

wherein the plurality of channels have dissimilar volumes and a substantially identical pressure drop across the length of each channel; and a mixing chamber comprising a plurality of inlets, each fluidly connected to a corresponding one of said plurality of channels.

In some embodiments, each channel comprises a flow restrictor fluidly connected to a conduit, the conduit being downstream of the flow restrictor.

In some embodiments, each of the plurality of conduits are of substantially equal length.

In some embodiments, at least some of the plurality of conduits are of different lengths.

In some embodiments, at least some of the plurality of conduits have different cross-sectional areas.

In some embodiments, the plurality of flow restrictors are substantially identical.

In some embodiments, the pressure drop across each of the plurality of flow restrictors is substantially identical.

In some embodiments, the pressure drop across the flow restrictor of a channel is greater than the pressure drop across the conduit of that channel.

In some embodiments, the pressure drop across the flow restrictor of a channel is at least 10 times greater than the pressure drop across the conduit of that channel.

In some embodiments, the plurality of channels are configured to have substantially identical volumetric flow rates.

In some embodiments, the flow splitter is configured to split the flow of fluid into first and second fluid streams, the second fluid stream having a higher density than the first fluid stream; and the mixing chamber comprises a first inlet and a second inlet, the second inlet positioned below the first inlet; and a mixing well, wherein the second inlet of the mixing chamber is configured to receive the first fluid stream and the first inlet of the mixing chamber is configured to receive the second fluid stream, to promote mixing of the first and second streams in the mixing well.

In some embodiments, the flow splitter comprises:

a splitter well in fluid communication with the inlet;

a first outlet in fluid communication with the splitter well, for conveying the first stream; and a second outlet in fluid communication with the splitter well, for conveying the second stream, In some embodiments, the second outlet is positioned below the first outlet.

In some embodiments, the first outlet and the second outlet are on opposing sides of the splitter well.

In some embodiments, the flow splitter comprises a splitter plate which presents a leading edge to the flow of fluid in use, to create said first stream above the splitter plate and said second stream below the splitter plate.

In some embodiments, the vertical position of the splitter plate is adjustable.

In some embodiments, at least a part of the splitter plate is generally co-planar with the direction of the flow of fluid in use.

In some embodiments, the fluid mixer further comprises:

a first channel having an inlet to receive and convey a first fluid stream towards an outlet of the first channel, the outlet of the first channel in fluid communication with a second inlet of the mixing chamber; and a second channel having an inlet to receive and convey a second fluid stream towards an outlet of the second channel, the outlet of the second channel in fluid communication with a first inlet of the mixing chamber.

In some embodiments, the length of the first channel is substantially the same as the length of the second channel.

In some embodiments, the volume of the first channel is substantially the same as the volume of the second channel.

In some embodiments, the cross-sectional area of the first channel is substantially the same as the cross-sectional area of the second channel.

In some embodiments, the first and second inlets of the mixing chamber are on opposing sides of the mixing well.

In some embodiments, the axis of the first inlet of the mixing chamber is substantially co-axial with the axis of the second inlet of the mixing chamber, such that the first and second fluid streams are directed substantially towards one another in the mixing well.

In some embodiments, the present invention provides a fluid mixer arrangement, comprising a plurality of fluid mixers according to the claims.

In some embodiments, the mixing chamber of each fluid mixer comprises an outlet and the plurality of fluid mixers are arranged in series, such that the outlet of the mixing chamber of a first mixer is fluidly connected to the inlet of the flow splitter of a subsequent fluid mixer.

In some embodiments, at least a second fluid mixer is provided in at least one of the fluid streams of a first fluid mixer.

BRIEF DESCRIPTION OF THE DRAWINGS

Embodiments will now be described, by way of non-limiting example only, with reference to the figures in which.

DETAILED DESCRIPTION

As will be understood from the following description, there are, in general, two aspects; (i) a fluid mixer which is able to split a flow of fluid into first and second fluid streams of different density and promote their mixing; and (ii) a fluid mixer comprising a plurality of channels, each of dissimilar volume but having a substantially identical pressure drop across each channel, which preferably ensures a substantially identical volumetric flow rate through each of the channels of the mixer.

Although aspects are initially illustrated and described separately, embodiments can adopt both aspects described herein. In other words, both the primary and secondary aspects are readily compatible with one another, allowing the provision of a fluid mixer which possesses the features of both aspects and offering the associated compound advantages.

Figure 1:
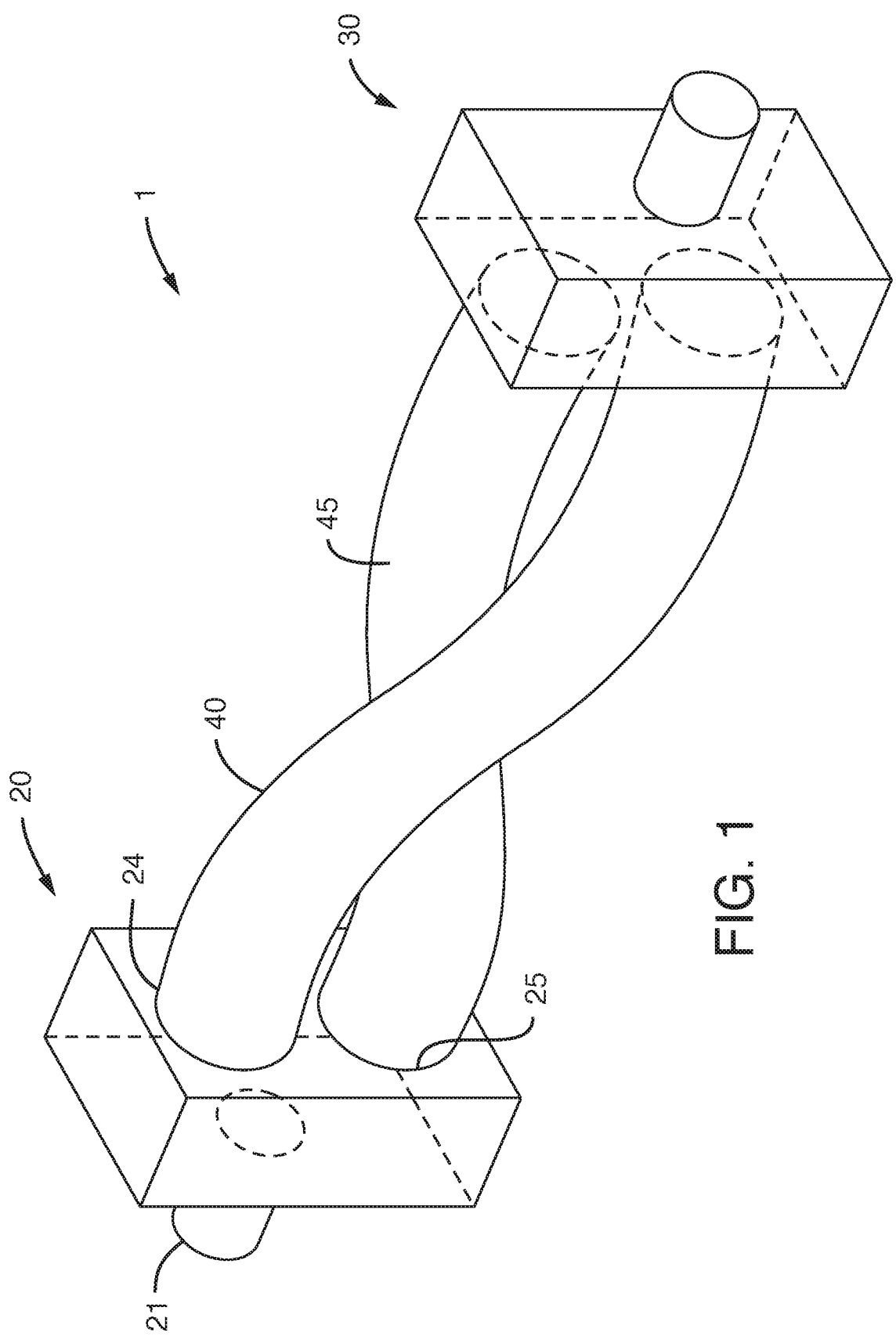
FIG. 1 schematically illustrates a fluid mixer according to one embodiment described herein.
Figure 2:
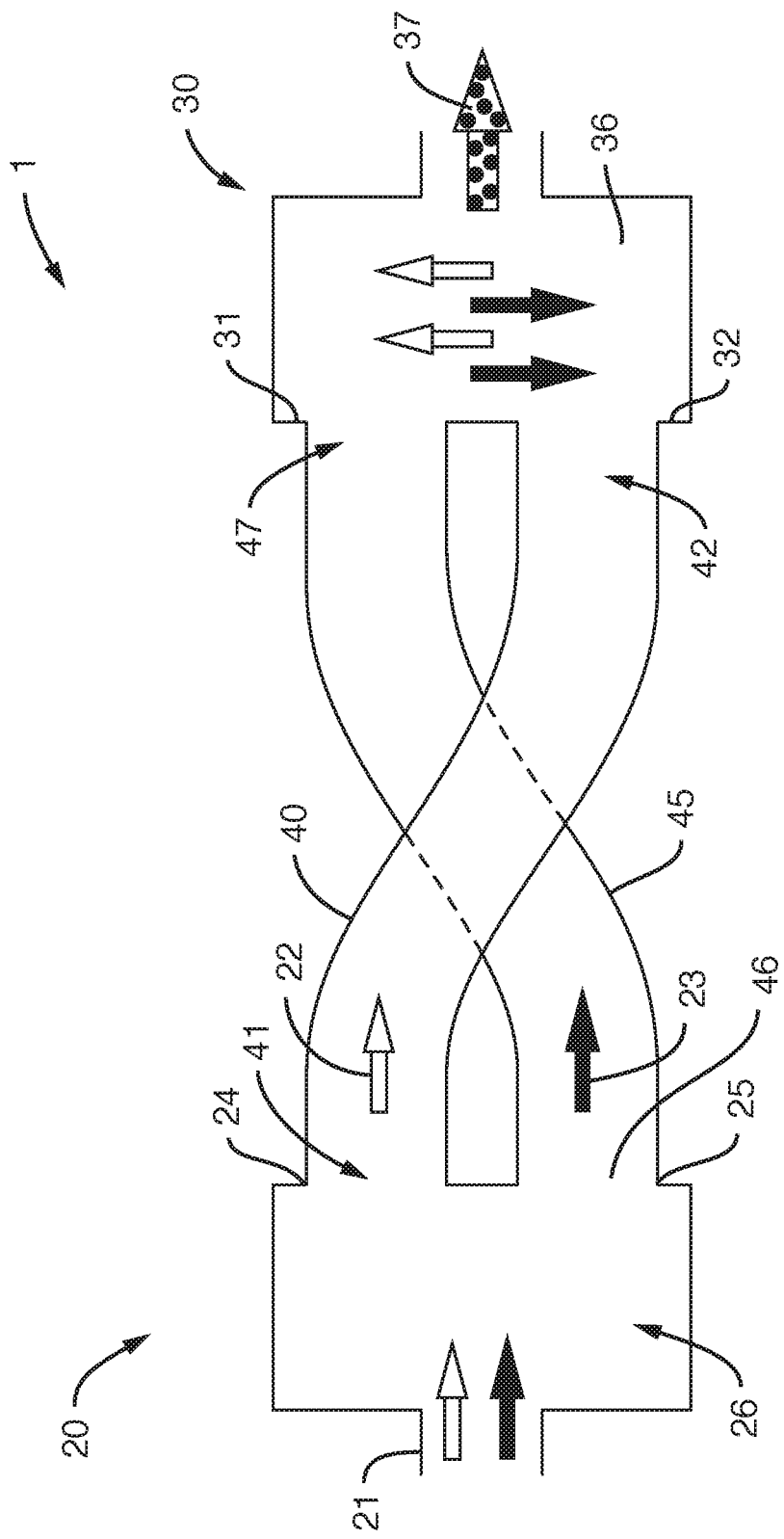
FIG. 2 schematically illustrates a vertical cross section of the fluid mixer shown in FIG. 1.

FIGS. 1 and 2 illustrate a fluid mixer (1) comprising a flow splitter (20) and a mixing chamber (30). The flow splitter (20) comprises an inlet (21) for receiving a flow of fluid to be mixed. The flow splitter (20) is configured to split the flow of fluid received at the inlet (21) into a first fluid stream (22) and a second fluid stream (23). The second fluid stream (23) has a higher density than the first fluid stream (22). In the embodiment shown, the flow of fluid received at the inlet (21) of the flow splitter (20) is split, by density, into the first (22) and second (23) fluid streams by virtue of gravity. As shown in the embodiment schematically illustrated in FIGS. 1 and 2, the first fluid stream (22) is vertically above the second fluid stream (23) at the point of leaving the flow splitter.

The composition of the fluid flow is schematically illustrated in FIG. 2 using 'black' and 'white' arrows. A white arrow, or the white element of an arrow, is used to signify the relatively less dense part of the fluid stream. A black arrow, or the black element of an arrow, is used to signify the relatively more dense part of the fluid stream. Thus, the arrow used to denote the first fluid stream (22) is white; and the arrow used to denote the second fluid stream (23) is black. The arrow used to denote the inlet flow of fluid is both black and white, signifying that it comprises both the first and second fluid streams, albeit not homogeneously mixed. The black and white arrows in the mixing chamber (36) signify the mixing of the first (22) and second (23) streams. The dotted arrow used to signify the outlet stream 37 schematically illustrates its substantially homogeneous nature.

Preferably, the flow splitter (20) comprises a splitter well (26) in fluid communication with the fluid inlet (21). The flow splitter (20) preferably further comprises a first outlet (24) in fluid communication with the splitter well (26), for conveying the first fluid stream (22) away from the splitter well (26). The flow splitter (20) preferably further comprises a second outlet (25) in fluid communication with the splitter well (26), for conveying the second fluid stream (23). Preferably, the first outlet (24) is vertically above the second outlet (25). FIG. 2 is a cross-sectional side view of the arrangement shown in FIG. 1. It is not essential that the first outlet (24) is exactly vertically above the second outlet (25). Preferably, the first outlet (24) is at least higher than the second outlet (25), such that, due to gravity, the second fluid stream (23) passing into the second outlet (25) will likely be more dense than the first fluid stream (22) passing into the first outlet (24).

Figure 3:
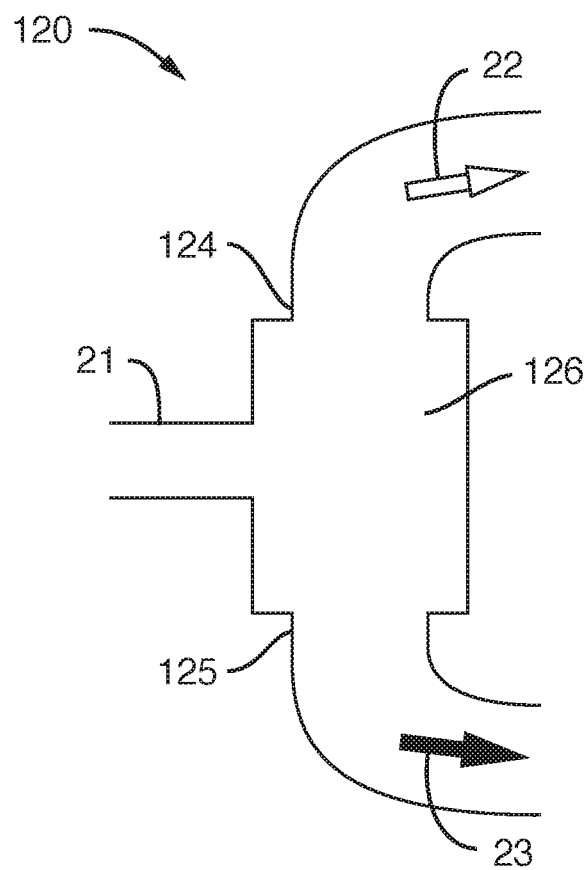
FIG. 3 schematically illustrates a flow splitter of a fluid mixer of an embodiment described herein.

An alternative flow splitter (120) is schematically illustrated in FIG. 3. As with the flow splitter (20) illustrated in FIGS. 1 and 2, the flow splitter (120) of FIG. 3 comprises an inlet (21). The flow splitter (120) further comprises a first outlet (124) and a second outlet (125). Rather than being positioned substantially next to one another, extending perpendicularly from the same plane, as in the embodiment illustrated in FIGS. 1 and 2, the first outlet (124) and second outlet (125) of the flow splitter (120) shown in FIG. 3 are arranged on opposing sides of the splitter well (126). At the point of connection to the flow splitter (120), the first outlet (124) and the second outlet (125) are directed away from one another. The arrangement shown in FIG. 3 may provide for more effective splitting of the fluid flow in the fluid inlet (21).

Figure 5:
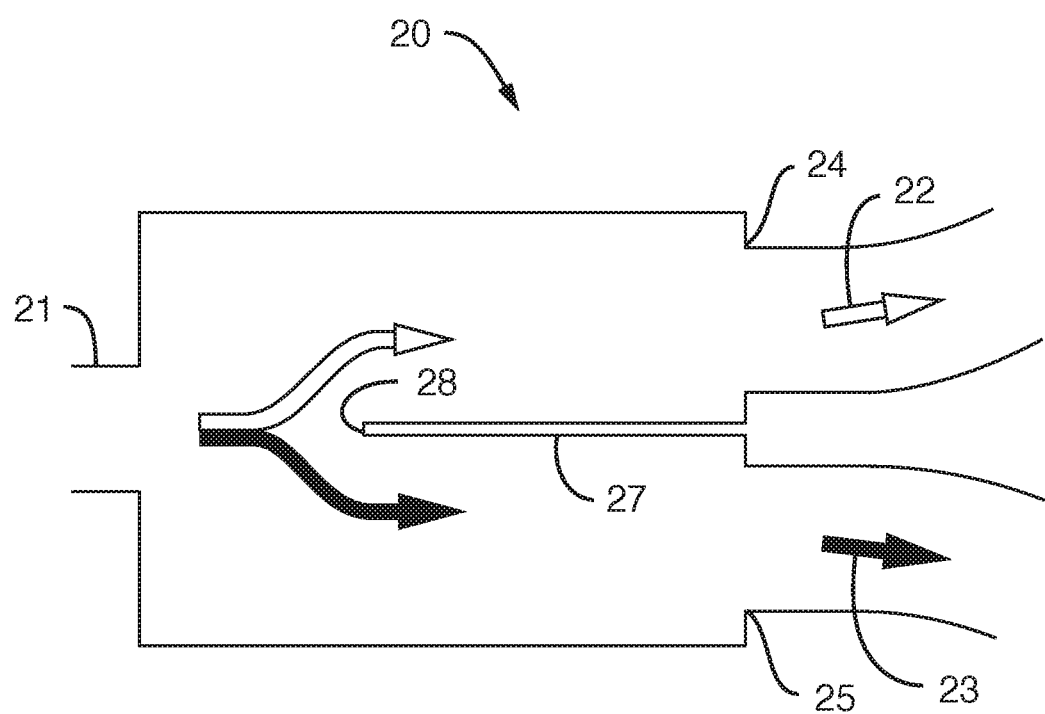
FIG. 5 schematically illustrates another flow splitter of a fluid mixer of an embodiment described herein.

FIG. 5 schematically illustrates another flow splitter (20) of a mixer. The flow splitter (20) illustrated in FIG. 5 generally corresponds to the flow splitter (20) shown in FIG. 2. However, the flow splitter (20) in FIG. 5 additionally comprises a splitter plate (27) which presents a leading edge (28) to the flow of fluid in use, to create a second fluid stream (23) having a lower density than a first fluid stream (22). Preferably, the axial length of the body of the flow splitter (20), i.e. the distance between the inlet (21) and the first (24) and second (25) outlets is configured such that the incoming fluid is able to be sufficiently passively separated, due to gravity, into a lower, dense, part and an upper, less dense, part. Preferably, the vertical position of the splitter plate (27) and/or the vertical position of the leading edge (28) of the splitter plate (27) is adjustable. In the case of the inlet fluid stream comprising two immiscible fluids. The position of the leading edge (28) and/or the splitter plate (27) may be configured so as to substantially align with the fluid boundary (meniscus) between the two immiscible fluids.

Preferably, at least a part of the splitter plate (27), preferably the part of the splitter plate (27) adjacent the leading edge (28), is generally coplanar with the direction of flow of the inlet fluid in use.

Returning to FIGS. 1 and 2, the mixing chamber (30) comprises a first fluid inlet (31) and a second fluid inlet (32). The second fluid inlet (32) is positioned vertically below the first inlet (31). Preferably, the second fluid inlet (32) is at least lower than the first inlet (31). The mixing chamber (30) further comprises a mixing well (36). The second inlet (32) of the mixing chamber (30) is configured to receive the first fluid stream (22). The first inlet (31) of the mixing chamber (30) is configured to receive the second fluid stream (23). The first (22) and second (23) fluid streams arrive at the mixing chamber (30) in an orientation which is inverted from the orientation in which they left the flow splitter (20). In other words, the first (22) and second (23) fluid streams are "flipped". The benefit of this arrangement is that it promotes more effective mixing of the first (22) and second (23) fluid streams in the mixing well (36) of the mixing chamber (30). The fluid output (37) of the fluid mixer (1) is preferably more homogenous than that received at the inlet (21) of the flow splitter (20) of the fluid mixer (1).

The fluid mixer (1) preferably further comprises a first channel (40) and a second channel (45). The first channel (40) has an inlet (41) configured to receive and convey the first fluid stream (22) towards an outlet (42) of the first channel (40). The inlet (41) of the first channel (40) is fluidly connected to the first outlet (24) of the flow splitter (20). The outlet (42) of the first channel (40) is in fluid communication with the second inlet (32) of the mixing chamber (30).

The fluid mixer (1) further comprises a second channel (45) having an inlet (46) which is configured to receive and convey the second fluid stream (23) towards an outlet (47) of the second channel (45). The inlet (46) of the second channel (45) is in fluid communication with the second outlet (25) of the flow splitter (20). The outlet (47) of the second channel (45) is in fluid communication with the first inlet (31) of the mixing chamber (30). The flow stream received at the inlet (21) is split vertically and then later rejoined in a reversed orientation. As a result, a less dense fluid stream is introduced into a more dense fluid stream from below and gravity causes the two fluid streams to mix—i.e. the more dense fluid stream flows 'through' the less dense fluid stream, causing mixing.

Preferably, the length of the first channel (40) is substantially the same as the length of the second channel (45). Preferably, the volume of the first channel (40) is substantially the same as the volume of the second channel (45). Preferably, the cross sectional area of the first channel (40) is substantially the same as the cross sectional area of the second channel (45).

Although in the embodiment schematically illustrated in FIGS. 1 and 2 the first (40) and second (45) channels appear to be of the same length, cross-section and volume, this is not essential. In another embodiment (described later) the volume of the first channel (40) may be dissimilar to the volume of the second channel (45).

In the embodiment schematically illustrated in FIGS. 1 and 2, the mixing chamber (30) is similar in form to the flow splitter (20). That is to say that the first (31) and second (32) inlets of the mixing chamber (30) are on the same side face of the mixing well (36), such that the respective axes of the first (31) and second (32) inlets are parallel to one another.

Figure 4:
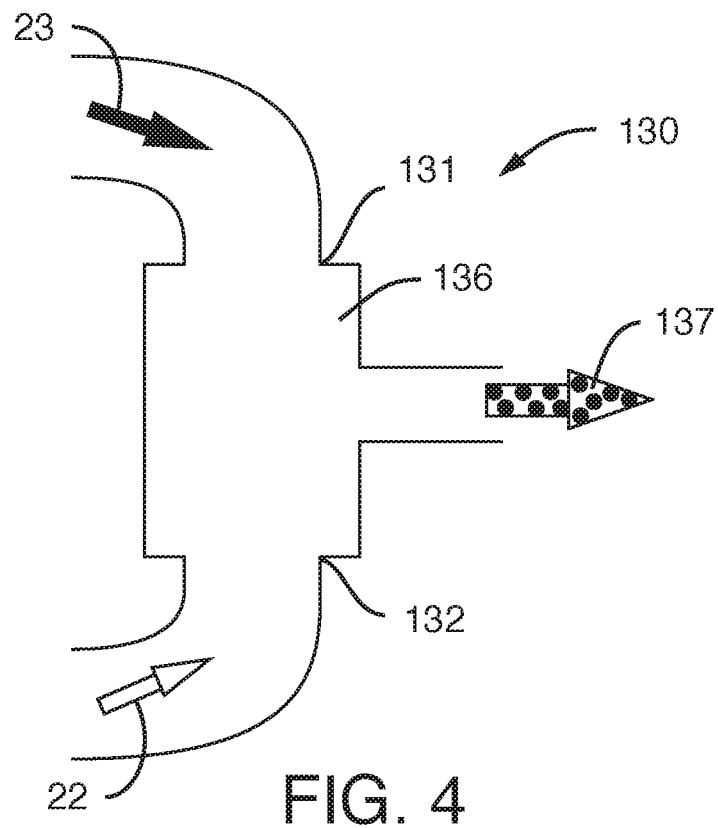
FIG. 4 schematically illustrates a mixing chamber of a fluid of an embodiment described herein.

In an alternative mixing chamber (130), schematically illustrated in FIG. 4, the first inlet (131) and the second inlet (132) of the mixing chamber (130) are provided on opposing sides of the mixing well (136). Consequently, the axis of the first inlet (131) of the mixing chamber (130) is substantially co-axial with the axis of the second inlet (132) of the mixing chamber (130), such that the first (22) and second (23) fluid streams are directed substantially towards one another in the mixing well (136), thereby aiding mixing. The relative velocity of the colliding first (22) and second (23) fluid streams will be the sum of the velocity of each stream (22, 23). The mixing well (36, 136) of the mixing chamber (30, 130) may comprise other features which aid the mixing of the first (22) and second (23) fluid streams. Such features may comprise components (not shown) to increase the turbulence of the fluid in the mixing well (36, 136). In some embodiments there may be a mechanical agitator (not shown) in the mixing well (36, 136).

Figure 6:
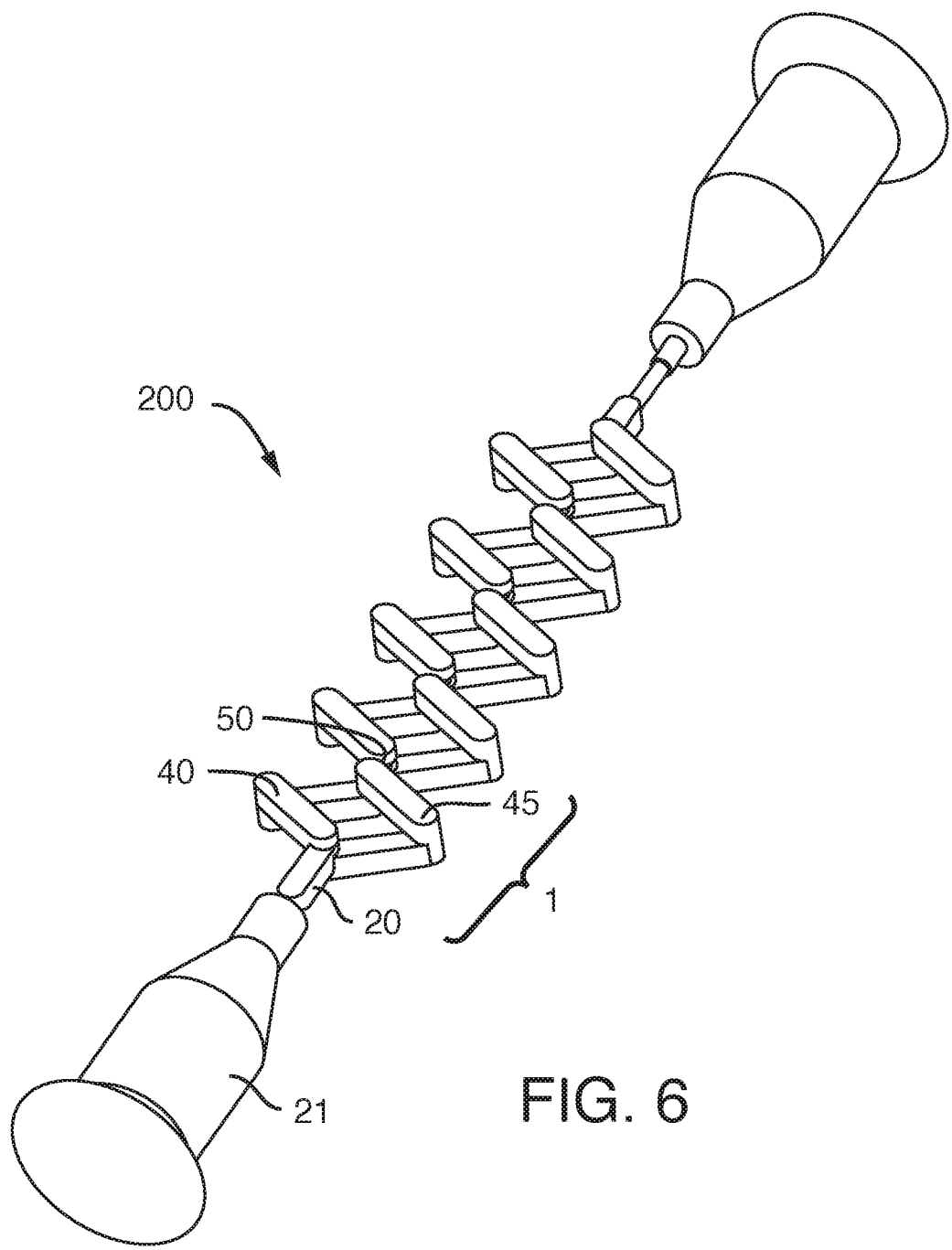
FIG. 6 illustrates a fluid mixer according to another embodiment described herein.

FIG. 6 illustrates a fluid mixer arrangement (200). The fluid mixer arrangement (200) comprises a plurality of fluid mixers (1) according to an embodiment described herein. In the fluid mixer arrangement (200) shown in FIG. 6, there are five fluid mixers (1) connected together in series. By connecting a plurality of fluid mixers (1) in series, the mixing, and thus homogenisation, of the fluid is preferably further improved.

In some embodiments, a fluid mixer is provided by forming cavities within a block of material, to define the flow splitter, mixing chamber and channels etc. Consequently, the figures illustrate a 'negative' of those cavities. This is why the inlet 21 illustrated in FIG. 6 apparently comprises a solid article—it is the 'negative' of the inlet 21.

Given the complex nature of the components of the invention, it will be appreciated that this method of illustrating the invention is clearer than providing multiple cross-sectional views and cut-through views of a block containing cavities which form the various features.

As illustrated, the first fluid mixer (1) in the series of the fluid mixer arrangement (200) shown in FIG. 6 comprises a fluid inlet (21) which is in fluid communication with a flow splitter (20). The flow splitter (20) splits the flow of fluid into first (22) and second (23) fluid streams, which are conveyed by first (40) and second (45) channels.

The first (40) and second (45) channels illustrated in FIG. 6 are of different physical form to those illustrated schematically in FIGS. 1 and 2. This is because the arrangement (200) shown in FIG. 6 is the negative of the channels which are formed in a microfluidic device. Preferably, the microfluidic device is formed by bonding multiple layers of material to one another, each layer comprising groove/indentations which are aligned together to form channels therein. The exact physical form of the first (40) and second (45) channels is not of significance. It is to be noted from FIG. 6 that the outlet (42) of the first channel (40) is positioned vertically below the outlet (47) of the second channel (45).

In-between the first and second fluid mixers (1) of the arrangement (200) shown in FIG. 6, there is preferably a combined mixing chamber and fluid splitter (50) downstream of the first fluid mixer (1), which serves to promote mixing of the first and second fluid streams (22), (23) received from the first mixer and to subsequently split the flow of fluid into first (22) and second (23) fluid streams for the second fluid mixer (1). The use of a fluid mixer arrangement (200) incorporating multiple stages of fluid mixers preferably increases turbulence and increases the homogenisation of the mixed fluid.

As well as connecting a plurality of fluid mixers in series, as illustrated in FIG. 6, a secondary fluid mixer may be provided within one of the fluid streams of a first fluid mixer. That is to say, between passing from the flow splitter (20) to the mixing chamber (30), one of the first (22) and second (23) fluid streams may be passed through a secondary fluid mixer which further splits that stream into two sub-streams and promotes mixing of the fluid in that stream. Multiple fluid mixers may be consecutively "nested" within a larger fluid mixer arrangement.

Figure 7:
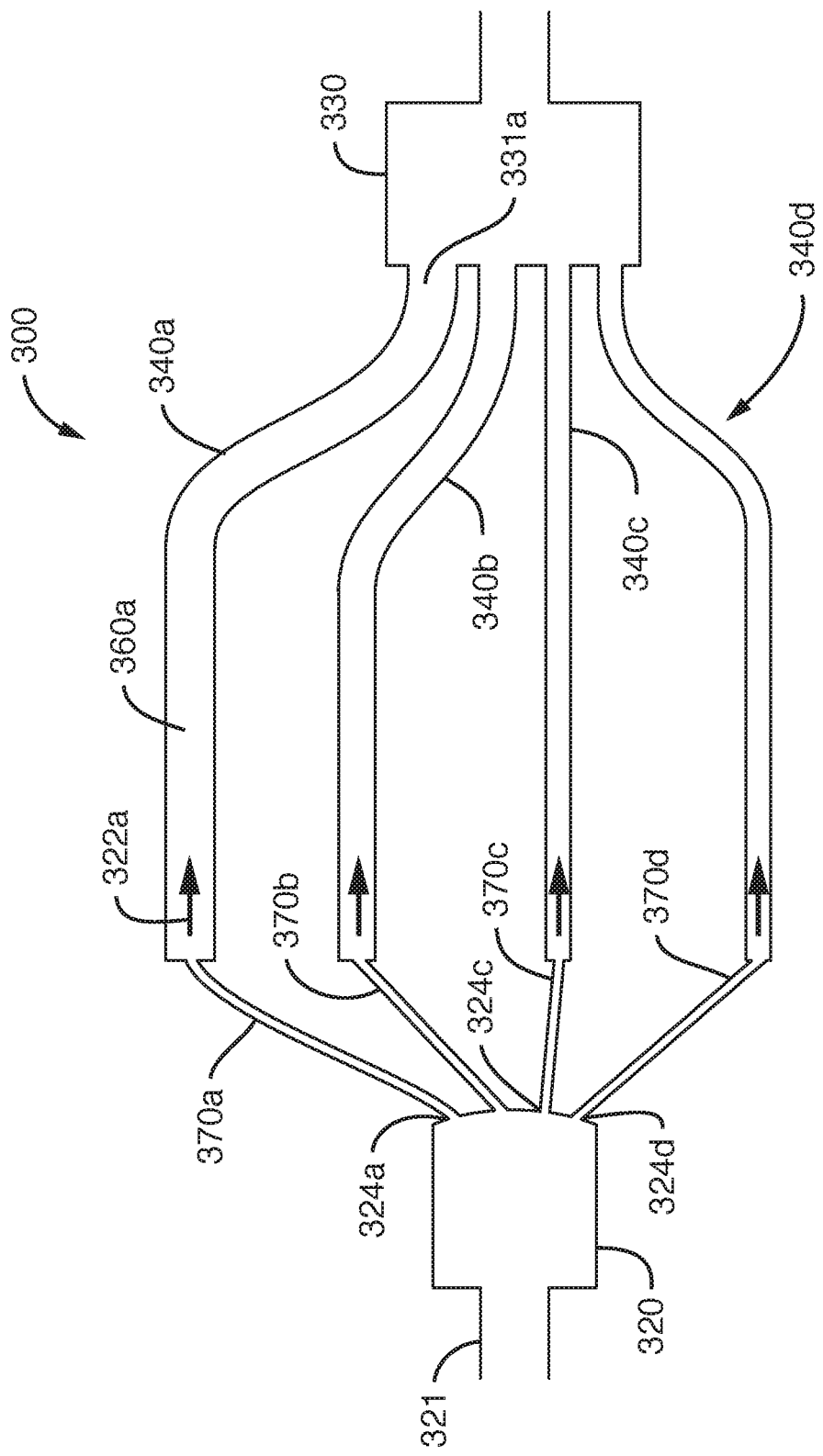
FIG. 7 schematically illustrates a fluid mixer according to another embodiment described herein.

FIG. 7 schematically illustrates a fluid mixer (300) embodying a second aspect.

The fluid mixer (300) comprises a flow splitter (320) comprising an inlet (321) for receiving a flow of fluid. The flow splitter (320) is configured to split the flow of fluid into a plurality of fluid streams (322a, 322b, 322c, 322d). Preferably, the flow splitter (320) comprises a plurality of outlets (324a, 324b, 324c, 324d). Despite the apparent similarity of the general configuration of the arrangements in FIGS. 2 and 7, FIG. 7 schematically illustrates the fluid mixer (300) in plan view (as compared to a side view). Therefore, the outlets (324a-d) are in the same horizontal plane. However, this is not essential.

The fluid mixer (300) further comprises a plurality of channels (340a, 340b, 340c, 340d), each for conveying a corresponding one of the plurality of streams (322a-d).

Each of the plurality of channels (340a-d) have dissimilar internal volumes but a substantially identical pressure drop across the length of each channel (340a-d).

The fluid mixer (300) further comprises a mixing chamber (330) comprising a plurality of inlets (331a, 331b, 331c, 331d), each fluidly connected to a corresponding one of the plurality of channels (340a-d). Thus, channel (340a) is connected to inlet (331a), channel (340b) is connected to inlet (331b) etc.

Each channel (340a-d) preferably comprises a flow restrictor (370a-370d) connected to a conduit (360a-360d), the conduit (360) being downstream of the flow restrictor (370a-370d).

In the embodiment illustrated in FIG. 7, each of the plurality of conduits (360a-d) are of substantially equal length.

In some embodiments, some or all of the conduits are of different lengths. In another embodiment, shown in FIG. 8, the conduits (460a-d) are all of different lengths.

In one embodiment, illustrated in FIG. 7, at least some of the plurality of conduits (360a-d) have different cross-sectional areas.

It will be appreciated that in order to have channels of dissimilar volumes, there are at least two ways of achieving this:
a) identical length but different cross-sectional area; or
b) identical cross-sectional area but different lengths.

Rather than being mutually exclusive, both ways of achieving dissimilar volumes may be adopted. Both the length and cross-sectional area of a channel may be different to both the length and cross-sectional area of another channel. The cross-sectional area of a channel may be uniform or non-uniform along its length.

Preferably, the plurality of flow restrictors (370a-d) are substantially identical such that the pressure drop across each of the plurality of flow restrictors (370a-d) is substantially identical.

Preferably, the pressure drop across a flow restrictor (370) is greater than the pressure drop across the conduit (360) of that channel (340). Preferably, the pressure drop across the flow restrictor (370) is at least 10 times greater than the pressure drop across the conduit (360) of that channel (340).

Preferably, the plurality of channels (340a-d) are configured to have substantially identical volumetric flow rates therethrough. A benefit of such an arrangement is that it suppresses, or substantially cancels, volumetric noise frequencies in the fluid stream without having differential volumetric flow rates through each of the channels which would otherwise create inconsistent channel clearance upon changing a solvent. Preferably, as a section of the flow of fluid at the inlet (321) of the flow splitter (320) is split into a plurality of fluid streams, those component parts of the inlet fluid stream will recombine at the mixing chamber (330) at substantially the same time.

When the conduits (360a-d) are of different lengths but substantially identical cross sections, the pressure drop across each of the conduits (360a-d) may differ. However, the pressure drop across a fluid restrictor (370a-d) is preferably substantially higher than the pressure drop across a corresponding conduit (360a-d). Consequently, the pressure drop across the channels (340a-d) as a whole will be substantially the same.

Figure 8:
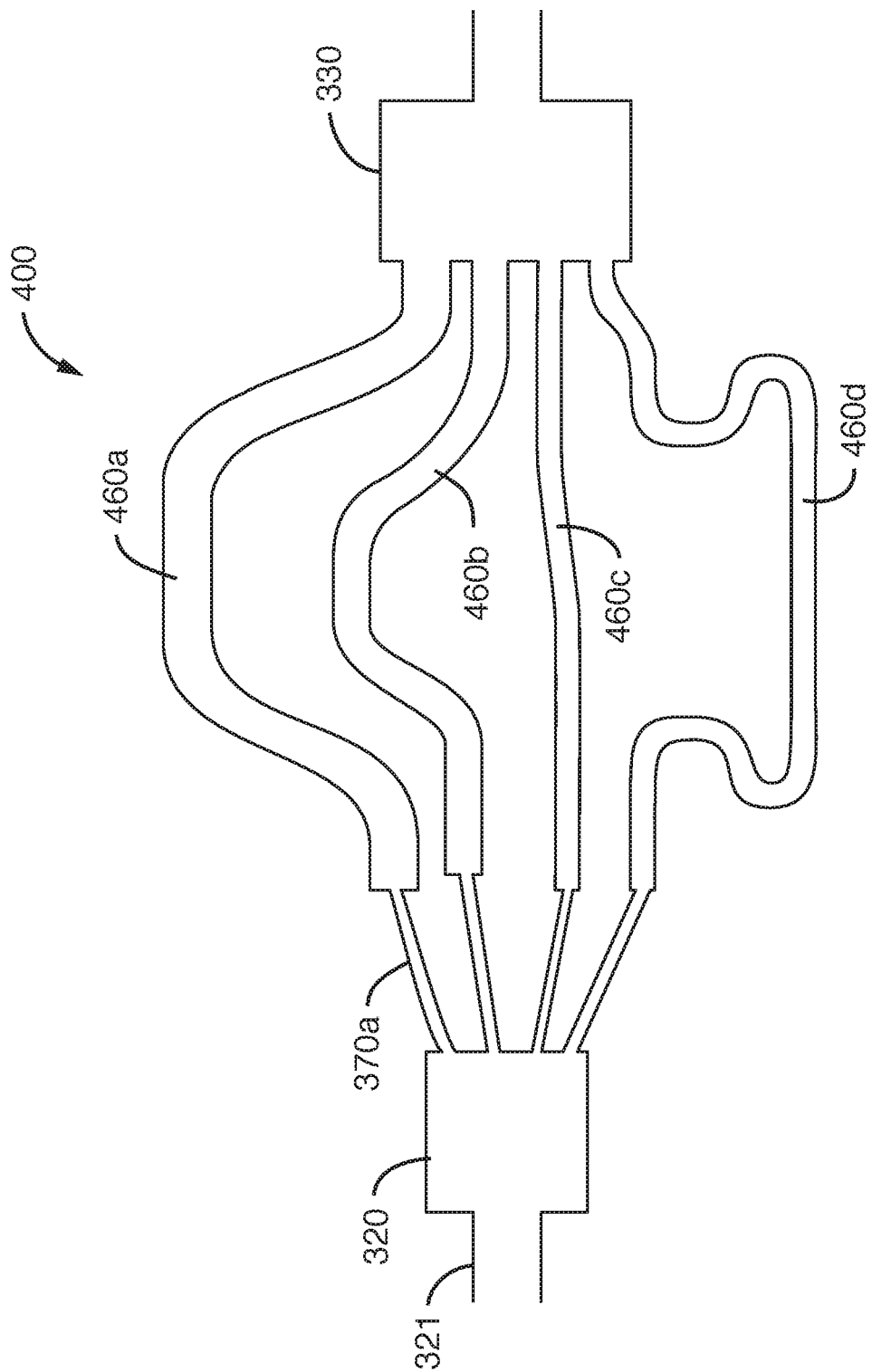
FIG. 8 schematically illustrates a fluid mixer according to another embodiment described herein.
Figure 9:
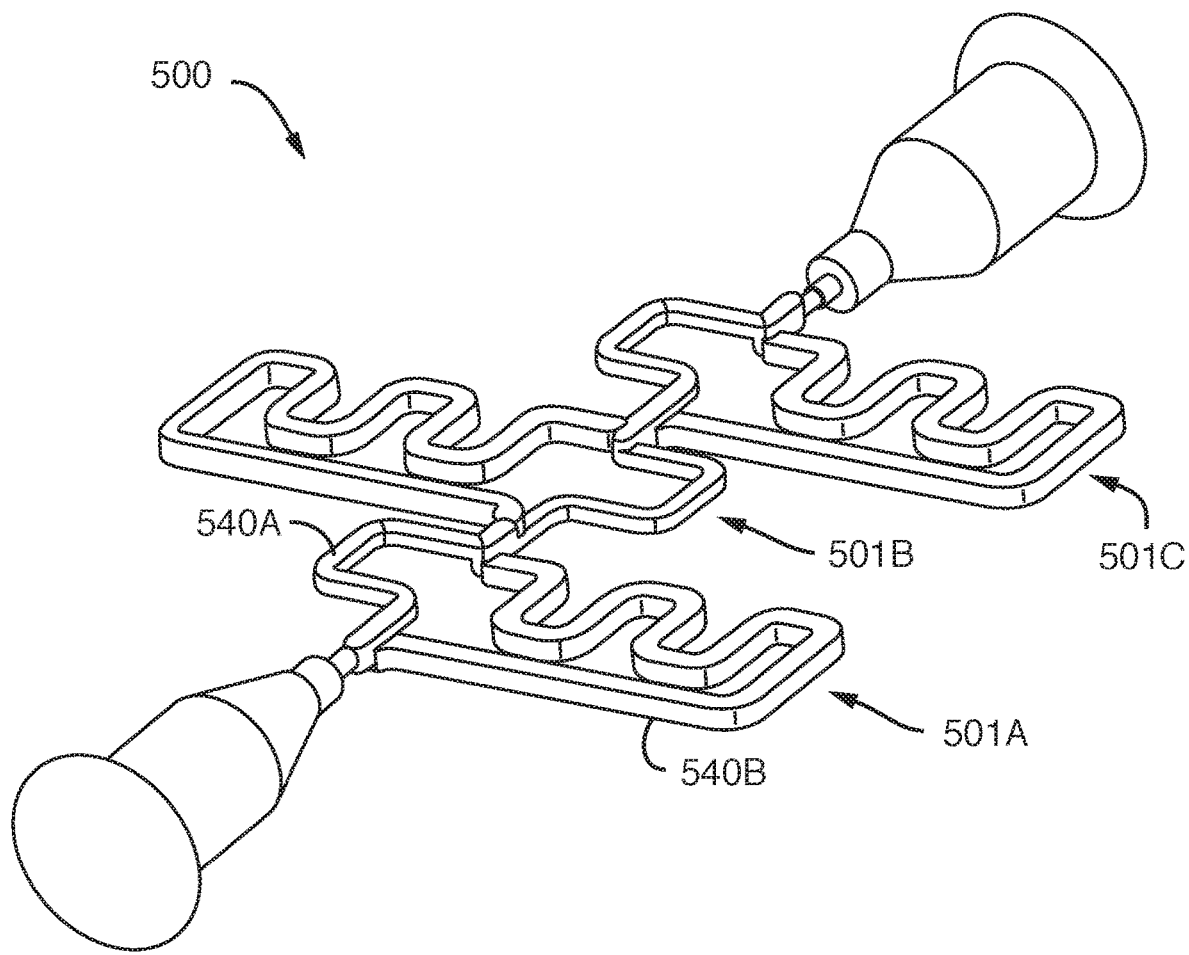
FIG. 9 illustrates a fluid mixer arrangement according to another embodiment described herein.

In the embodiments schematically illustrated in FIGS. 7 and 8 there are four channels (340a-d), but this is not essential. There may be more or fewer than four channels. There may be two channels. As with the fluid mixer (1) illustrated in FIGS. 1 to 6, a plurality of fluid mixers (300, 400) may be provided in a fluid mixer arrangement. FIG. 9 illustrates a fluid mixer arrangement (500) comprising three fluid mixers (501a), (501b), (501c), connected in series. Accordingly, the arrangement (500) shown in FIG. 9 generally corresponds to the arrangement (200) illustrated in FIG. 6, by providing a series of interconnected fluid mixers.

In the embodiment illustrated in FIG. 9, each of the fluid mixers (501a-c) comprises two channels (540a-b).

Figure 10:
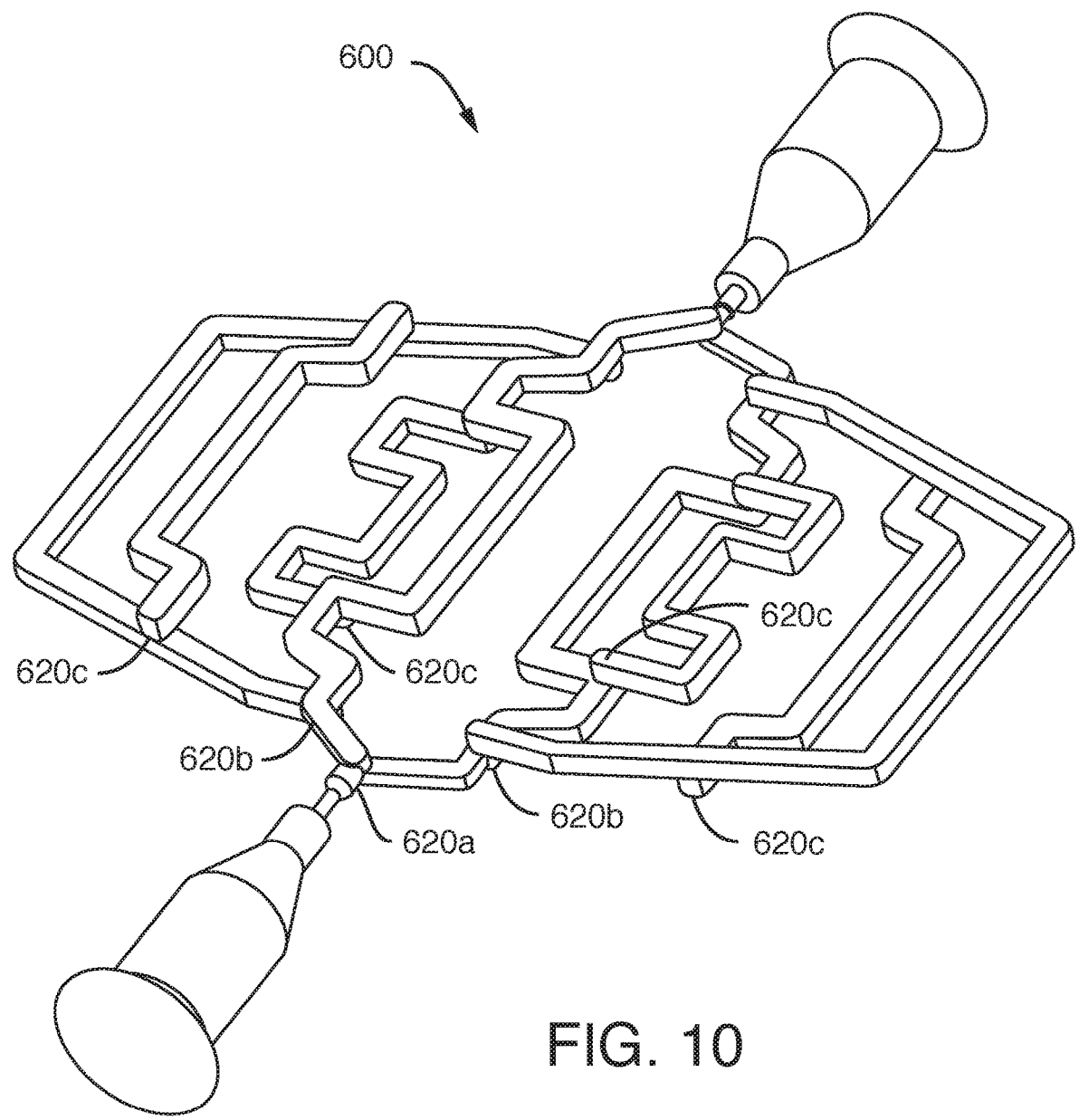
FIG. 10 illustrates a fluid mixer arrangement according to another embodiment described herein.

FIG. 10 illustrates another fluid mixer arrangement (600), which comprises 8 channels (640).

In the embodiment shown in FIG. 10, rather than providing a single flow splitter, such as the flow splitter (320) illustrated in FIGS. 7 and 8, having multiple (e.g. three or more) outlets (324a-d), the mixer arrangement (600) illustrated in FIG. 10 comprises a series of flow splitters (620a-c), which each split the incoming fluid flow into two fluid streams. Each of those fluid streams is then further split by a second stage splitter into two sub-streams, which are then split by a third stage of flow splitter. With reference to FIG. 10, each of the two fluid streams exiting the first stage flow splitter (620a) communicate with a respective second stage flow splitter (620b). Each of the fluid streams from each of those second stage flow splitters (620b) are then fed to a third stage flow splitter (620c). There is a single first stage flow splitter (620a), two second stage flow splitters (620b) and four second stage flow splitters (620c). This allows for the fluid flow ultimately to be split into eight separate channels (640), as illustrated in FIG. 10.

FIG. 6 illustrates a mixer arrangement comprising a plurality of the same type of fluid mixer (embodying the first aspect). Likewise, FIG. 9 illustrates a mixer arrangement comprising a plurality of mixers embodying the second aspect of the invention. It is, of course, possible to provide a mixer arrangement comprising different fluid mixers connected in series. For example, a fluid mixer as illustrated in FIGS. 1 and 2 may be provided upstream of the fluid mixer illustrated in FIG. 7. Any combination of any of the mixers illustrated, described and/or envisaged herein may be connected together to form a mixer arrangement.

As noted above, both the primary and second aspects can be combined in a single mixer embodiment.

Figure 11:
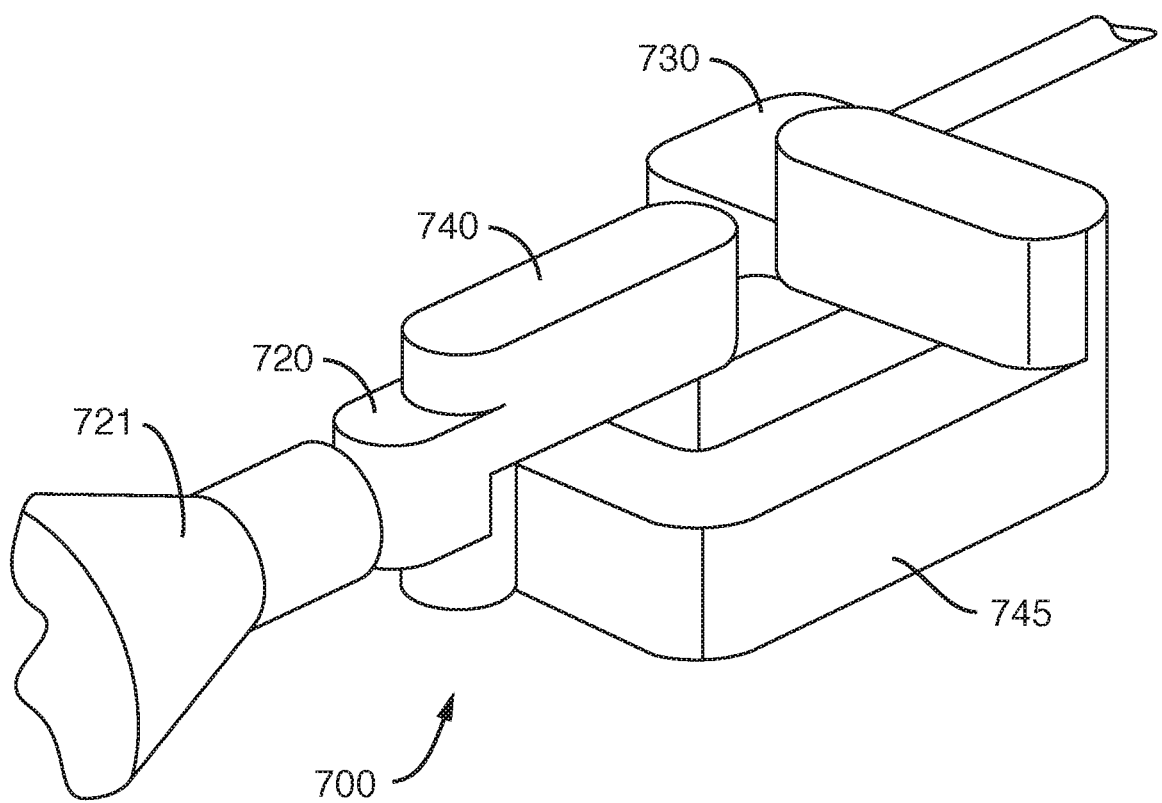
FIG. 11 illustrates a fluid mixer arrangement according to another embodiment described herein.

FIG. 11 illustrates a fluid mixer (700) comprising a flow splitter (720) comprising an inlet (721) for receiving a flow of fluid. The flow splitter (720) is configured to split the flow of fluid into first and second fluid streams. The second fluid stream has a higher density than the first fluid stream. It is to be noted from FIG. 11 that the flow splitter (720) has an arrangement corresponding to that of the flow splitter (120) illustrated in FIG. 3—i.e. outlets on opposing sides of the chamber.

The fluid mixer (700) of FIG. 11 further comprises a mixing chamber (730) comprising a first inlet and a second inlet (partially obscured in FIG. 11). The fluid mixer (700) further comprises a first channel (740) which conveys the first fluid stream from the flow splitter (720) to the second inlet of the mixing chamber (730). The fluid mixer (700) further comprises a second channel (745) configured to receive and convey the second fluid stream towards the first inlet of the mixing chamber (730). The first inlet of the mixing chamber (730) is arranged vertically above the second inlet of the mixing chamber (730). Accordingly, as with the embodiments illustrated and described with reference to FIGS. 1 to 6, the first and second fluid streams are inverted, promoting mixing as they recombine in the mixing chamber (730).

Furthermore, the first channel (740) has a different length and cross section to the second channel (745). Accordingly, the channels (740, 745) have dissimilar volumes. Preferably, they have substantially identical pressure drops across the length of each of the first (740) and second (745) channels.

A benefit of an embodiment, such as the fluid mixer (700) illustrated in FIG. 11, combining both the primary and secondary aspects is that it provides a fluid mixer which has advantages of each aspect of the invention. Specifically, the inversion of the split fluid stream promotes homogenisation of the fluid, whereas the use of channels with dissimilar volumes but equal pressure drops serves to reduce, or substantially cancel, volumetric noise frequencies.

Figure 12:
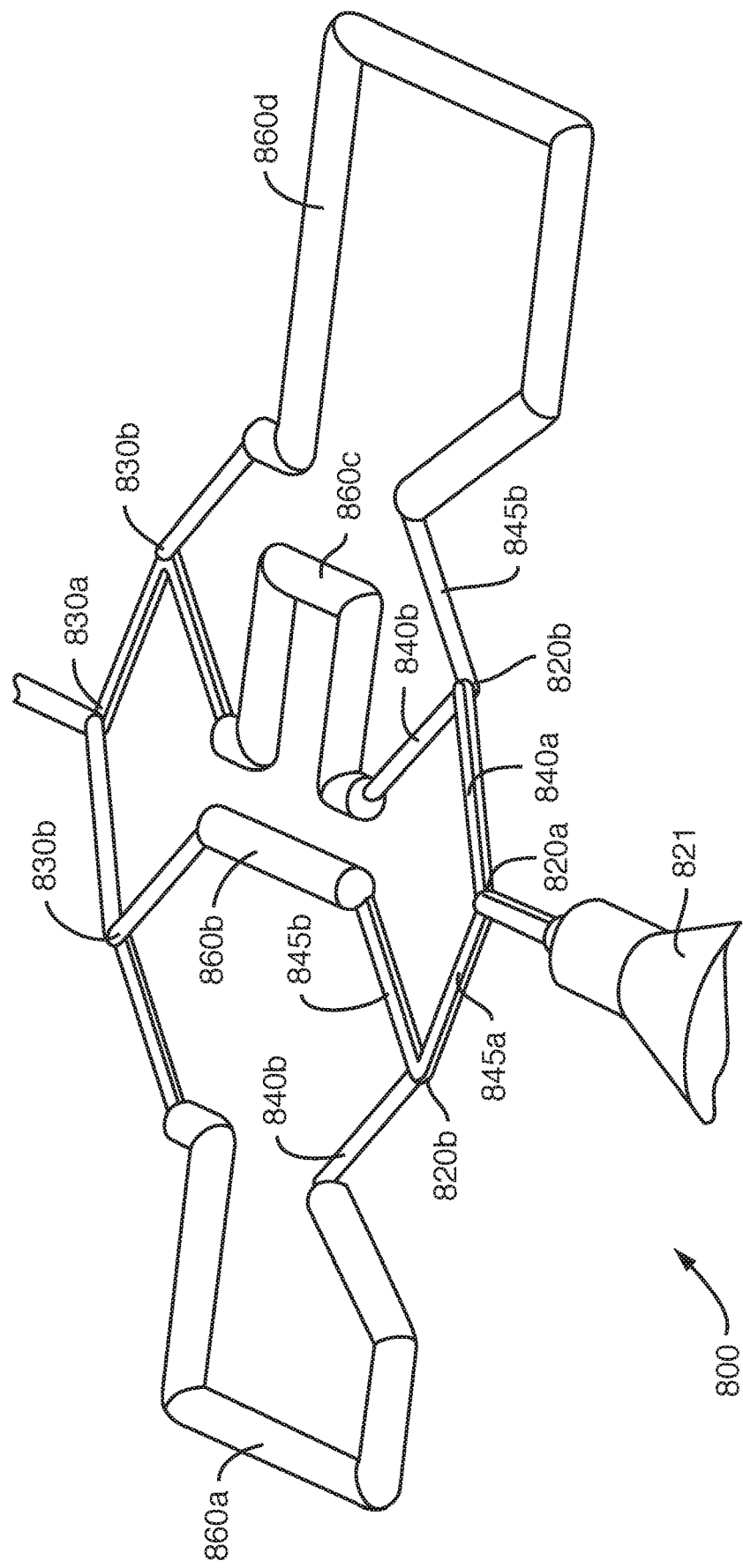
FIG. 12 illustrates a fluid mixer arrangement according to another embodiment described herein.

FIG. 12 shows another fluid mixer (800) incorporating both the primary and secondary aspects. In a similar fashion to the fluid mixer (600) shown in FIG. 10, the fluid mixer (800) shown in FIG. 12 comprises four parallel channels which are all of dissimilar volumes but substantially identical pressure drops thereacross.

In the mixer arrangement shown in FIG. 12, each parallel channel (840) comprises a conduit (860) and a fluid restrictor (not labelled). The fluid mixer (800) shown in FIG. 12 comprises two stages of flow splitter (820). The initial fluid stream from the fluid inlet (821) is split into two fluid streams (of different densities) and conveyed via a first channel (840a) and a second channel (845a). Each of those channels (840a), (845b) then communicates with a second stage flow splitter (820b) which further splits the fluid flow into two further channels (840b), (845b). The second stage flow splitters (820b) also split the fluid into first and second fluid streams of different densities. The fluid then passes through the four conduits (860a-d). It is to be noted that the network of channels between the fluid inlet (821) and the fluid conduit (860a)-(860d) create four pathways which are substantially of the same length. Preferably, the pathways create a fluid restrictor, each having a substantially identical pressure drop thereacross. Downstream of the fluid conduits (860a)-(860d), the fluid streams recombine in a two stage mixing chamber (830) arrangement.

The fluid mixers of FIGS. 11 and 12 conveniently incorporate, harmoniously and synergistically, each of the primary and secondary aspects. A benefit of providing a single mixer incorporating both the first and second aspects of the invention, rather than two separate mixers connected in series, is that the dwell volume is kept to a minimum, allowing a decrease in cycle time.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A fluid mixer comprising:
a flow splitter comprising a splitter well having a plurality of sides, the splitter well having an inlet in a first side for receiving a flow of fluid, a first outlet on a second side for conveying a first stream and a second outlet on a third side for conveying a second stream, the third side being opposite to the second side and the first outlet being above the second outlet with respect to gravity, the second fluid stream having a higher density than the first fluid stream; and
a mixing chamber comprising a first inlet, a second inlet and a mixing well having a plurality of sides, the second inlet positioned below the first inlet with respect to gravity, wherein the second inlet of the mixing chamber is configured to receive the first fluid stream and the first inlet of the mixing chamber is configured to receive the second fluid stream, to promote mixing of the first and second streams in the mixing well.

2. A fluid mixer according to claim 1 further comprising a splitter plate disposed inside the splitter well.

3. A fluid mixer according to claim 2, wherein the vertical position of the splitter plate with respect to gravity is adjustable.

4. A fluid mixer according to claim 2, wherein at least a part of the splitter plate is generally co-planar with the direction of the flow of fluid in use.

5. A fluid mixer according to claim 1, further comprising:
a first channel having an inlet to receive and convey the first fluid stream towards an outlet of the first channel, the outlet of the first channel in fluid communication with the second inlet of the mixing chamber; and
a second channel having an inlet to receive and convey the second fluid stream towards an outlet of the second channel, the outlet of the second channel in fluid communication with the first inlet of the mixing chamber.

6. A fluid mixer according to claim 5, wherein the length of the first channel is substantially the same as the length of the second channel.

7. A fluid mixer according to claim 5, wherein the cross-sectional area of the first channel is substantially the same as the cross-sectional area of the second channel.

8. A fluid mixer according to claim 5, wherein the channels are configured to have substantially identical volumetric flow rates.

9. A fluid mixer according to claim 1, wherein the first and second inlets of the mixing chamber are on opposing sides of the mixing well.

10. A fluid mixer according to claim 9, wherein the axis of the first inlet of the mixing chamber is substantially co-axial with the axis of the second inlet of the mixing chamber, such that the first and second fluid streams are directed substantially towards one another in the mixing well.

* * * * *